No. 769,860.

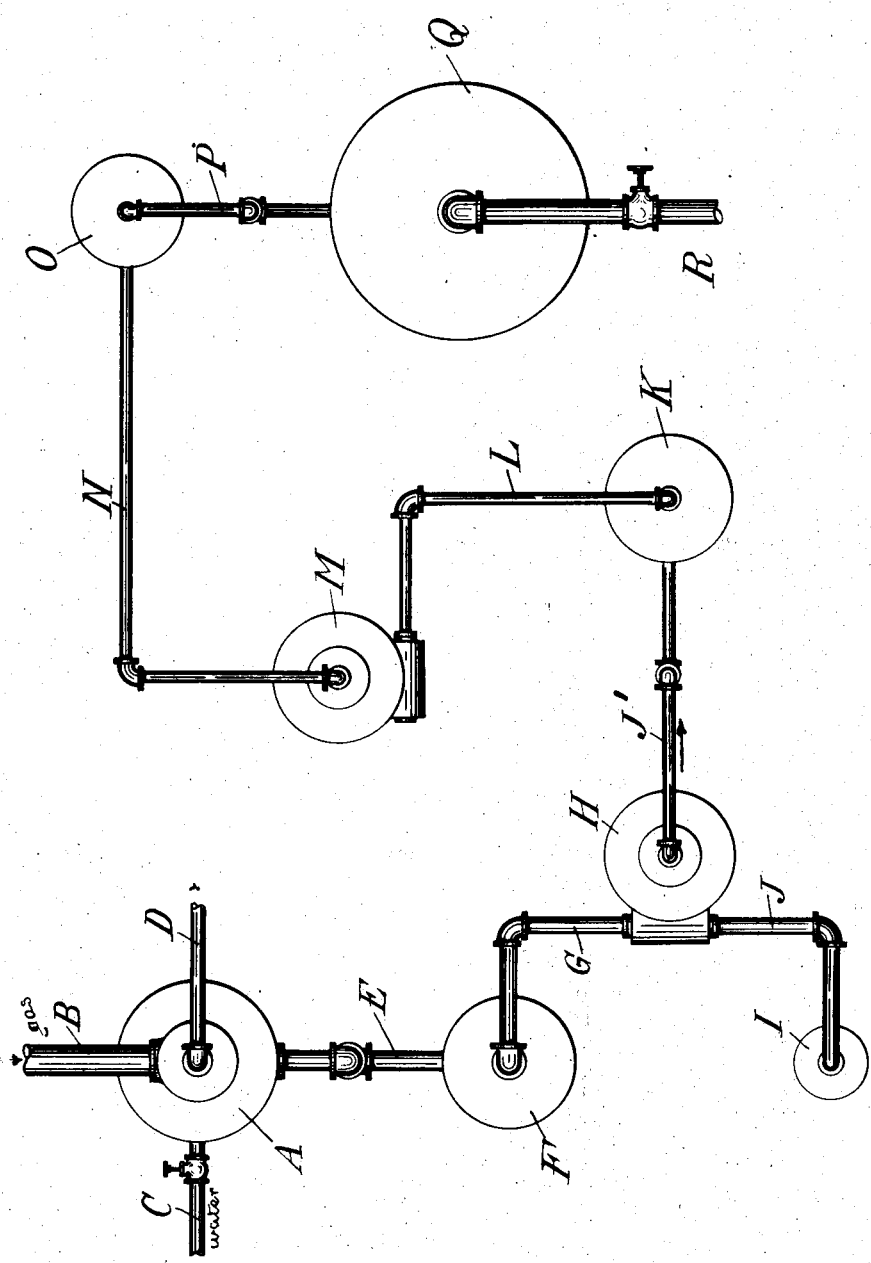

Patented September 13, 1904.

UNITED STATES PATENT OFFICE.

WILLARD O. FELT, OF NEW YORK, N. Y.

PROCESS OF PURIFYING GAS.

SPECIFICATION forming part of Letters Patent No. 769,860, dated September 13, 1904.

Application filed November 19, 1902. Serial No. 131,927. (No specimens.)

*To all whom it may concern:*

Be it known that I, WILLARD O. FELT, a citizen of the United States, and a resident of the city, county, and State of New York, have invented certain new and useful Improvements in Processes of Purifying Illuminating-Gas, of which the following is a specification.

My invention relates to the purification of illuminating-gas, and has for its object to more thoroughly and economically purify said gas without affecting its illuminating power.

The drawing forming part of this specification represents diagrammatically one form of apparatus.

The gas is taken from the generator direct or from the hydraulic main and passes through a pipe B into a condenser A. This condenser is what is termed a "surface" condenser—that is, the gas is cooled without direct contact with the water. This condenser is supplied with water-inlets C and a water-outlet D and with a gas-outlet pipe E. From the outlet-pipe the gas passes to a scrubber F, which is of any suitable or well-known variety. From the scrubber F the gas is drawn through a pipe G by a pump H. This pump is of any suitable construction. A form of pump which I have found useful in the practice of this process is shown in Patent No. 224,668, dated February 17, 1880. Connected to the pump by means of a pipe J is a glycerin-tank I, so that as the pump is operated not only gas but glycerin will be drawn into the pump, and therefore on the return stroke of the pump-plunger the gas and glycerin will be forced out together through the delivery-pipe J', thus intimately mixing the gas and the glycerin. The gas and glycerin pass through the pipe J' into a separating-tank K of any suitable construction, the glycerin and absorbed and contained impurities falling to the bottom of said tank and the gas being drawn through a pipe L by means of a pump M, which discharges the gas through a pipe N to a tank O, containing ferric oxid, preferably in the form of a sponge, or lime or other substance of a like character. From the tank O the gas passes through a pipe P to a gasometer or storage-tank Q, from which it may be drawn for use through a pipe R. The results accomplished by the use of this apparatus in the manner described are as follows: By passing the gas through a condenser before it goes into the scrubber without bringing the gas in actual contact with the water I lower its temperature, the result being that the gas entering the scrubber at a low temperature is cleaned with the least possible loss of its illuminating power, considerable loss occurring if the gas be introduced into the scrubber at a high temperature. The scrubber takes out from the gas a certain amount of ammonia and carbonic acid.

The mixing of the gas with glycerin, which is effected by the pump H, is a very important feature of my invention. I have discovered that by subjecting the gas to the action of glycerin I am enabled to remove practically all the water, tar, unfixed gases, and similar impurities. The gas thus partially purified is subjected to the action of the oxid in the tank O. The use of the separator K is simply to remove the glycerin charged with the impurities, which is taken up or removed. The partially-purified gas when subjected to the action of the oxid is deprived of the sulfureted hydrogen and sulfur compounds, leaving the gas in a practically pure state and ready for consumption.

In practicing my process I may omit the use of the condenser, though better results are produced by its use, and I may omit the use of the pump H, as this step of the invention may be said to consist in subjecting the gas to the action of glycerin or a similar substance. The pump is used for the reason that it facilitates the thorough mixing of the gas and glycerin with a consequent reduction of time. The pump M is used both to facilitate the speed of the operation and for another reason namely, that I have discovered that by passing the gas through the oxid-tank under pressure the capacity of the oxid for removing the impurities is greatly increased—that is to say, for each increase of an atmosphere in pressure I increase the cleansing capacity of the oxid by a large ratio.

Instead of discharging the glycerin and gas together, as described, I may have the clearances and pressure-chamber of the pump partly filled with glycerin, through which the gas forced out by the pump passes. This will be apparent upon inspection of the patent heretofore referred to.

In fact, various changes may be made in the form and kind of the apparatus and various of the steps may be repeated, as will be evident to those skilled in the art.

What I claim, and desire to secure by Letters Patent, is—

1. That step in the process of purifying illuminating-gas which consists in subjecting the gas to the action of glycerin, substantially as described.

2. The process of purifying gas which consists in subjecting the gas to the action of glycerin and subsequently to the action of an oxid, substantially as described.

3. The process of purifying illuminating-gas which consists in the following steps: first, cooling the gas from the mains without bringing it into contact with the cooling liquid; second, subjecting the gas to the action of a scrubber; third, subjecting the gas to the action of glycerin, and fourth, subjecting the gas to the action of an oxid, substantially as described.

In witness whereof I have hereunto set my hand, at the city, county, and State of New York, this 11th day of November, 1902.

WILLARD O. FELT.

In presence of—
    Louis N. Whealton,
    Henry Bossong.